United States Patent
Urban et al.

[11] Patent Number: 5,660,593
[45] Date of Patent: Aug. 26, 1997

[54] OUTER JOINT PART PRODUCED AS A FORMED PLATE METAL PART

[75] Inventors: Peter Urban, Köln; Bert Zimmerman, Bonn, both of Germany

[73] Assignee: GKN Automotive AG, Lohmar, Germany

[21] Appl. No.: 398,152

[22] Filed: Mar. 3, 1995

[30] Foreign Application Priority Data

Mar. 12, 1994 [DE] Germany ............ 44 08 371.8

[51] Int. Cl.$^6$ .................................................. F16D 3/226
[52] U.S. Cl. .................................. 464/144; 464/906
[58] Field of Search ............................. 464/142, 143, 464/144, 145, 146, 906

[56] References Cited

U.S. PATENT DOCUMENTS

| | | | |
|---|---|---|---|
| 2,047,660 | 7/1936 | Anderson | 464/144 |
| 3,002,364 | 10/1961 | Bellomo | 464/144 |
| 3,133,431 | 5/1964 | Zech | 464/144 |
| 3,613,397 | 10/1971 | Okoshi | 464/144 |
| 3,899,898 | 8/1975 | Takahashi et al. | 464/144 |
| 3,928,985 | 12/1975 | Girguis | 464/144 X |
| 3,965,701 | 6/1976 | Orain | 464/144 |
| 4,473,360 | 9/1984 | Devos | 464/144 |
| 4,678,453 | 7/1987 | Aucktor et al. | 464/144 |
| 4,995,853 | 2/1991 | Schwärzler et al. | 464/144 |
| 5,186,687 | 2/1993 | Hayashi et al. | 464/144 |

FOREIGN PATENT DOCUMENTS

| | | | |
|---|---|---|---|
| 062067 | 10/1982 | European Pat. Off. | |
| 2673128 | 8/1992 | France. | |
| 175826 | 9/1985 | Japan | 464/111 |
| 956894 | 4/1964 | United Kingdom | 464/144 |
| 2271162 | 4/1994 | United Kingdom | 464/144 |

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

An outer joint part for a constant velocity universal ball joint, produced from a tubular member formed from a plate metal part and provided with substantially longitudinally extending ball tracks intended for receiving torque transmitting balls, with an axial central portion of the tubular member is reduced in cross-section relative to two axial end regions and is provided with ball tracks, with a substantially radial flange formed on at one axial end of the tubular member, with the center lines of the ball tracks extending in a non-parallel way relative to the axis A of the outer joint part and with the axial end of the tubular member positioned opposite the flange remaining undeformed.

7 Claims, 5 Drawing Sheets

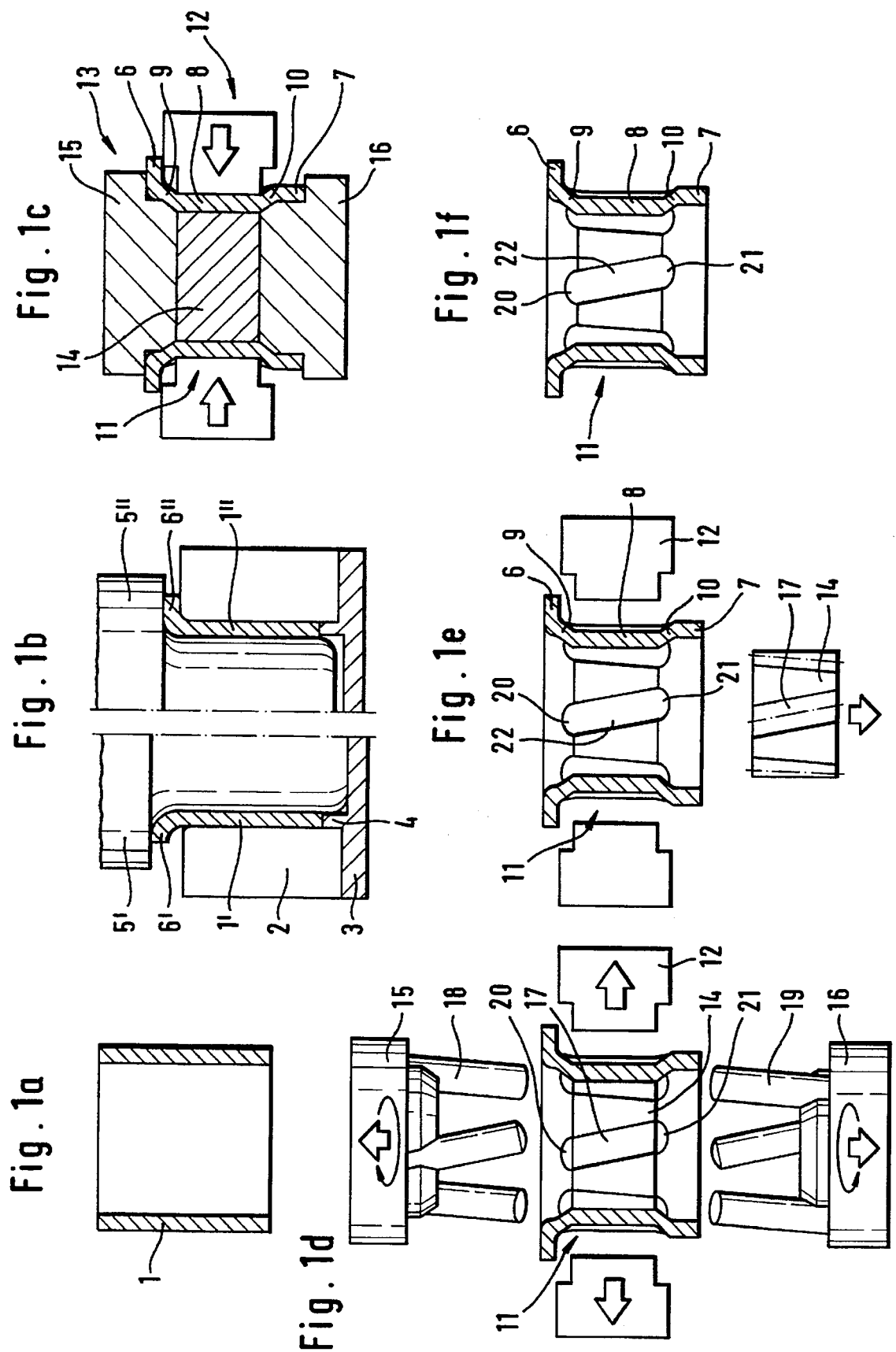

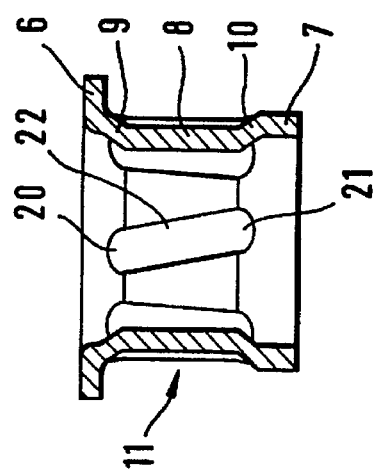
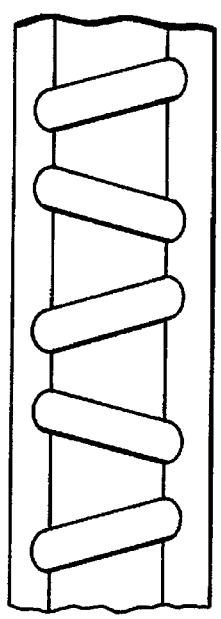
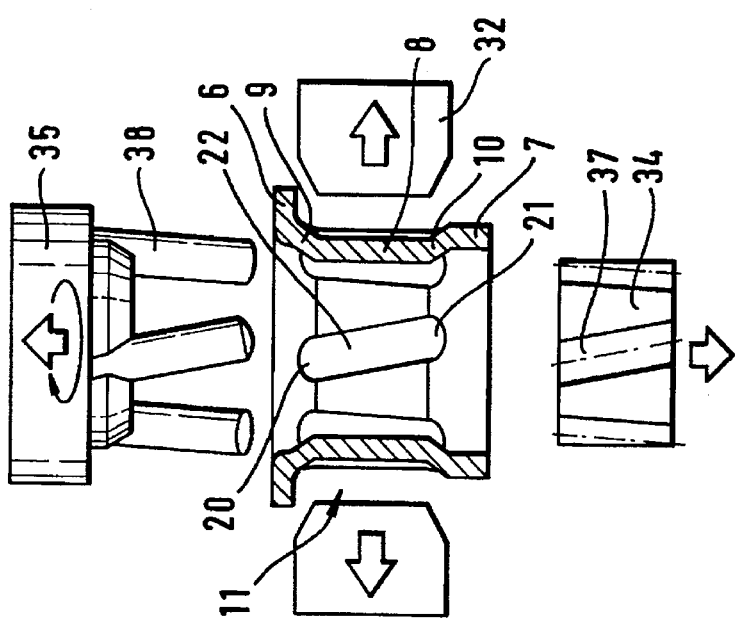
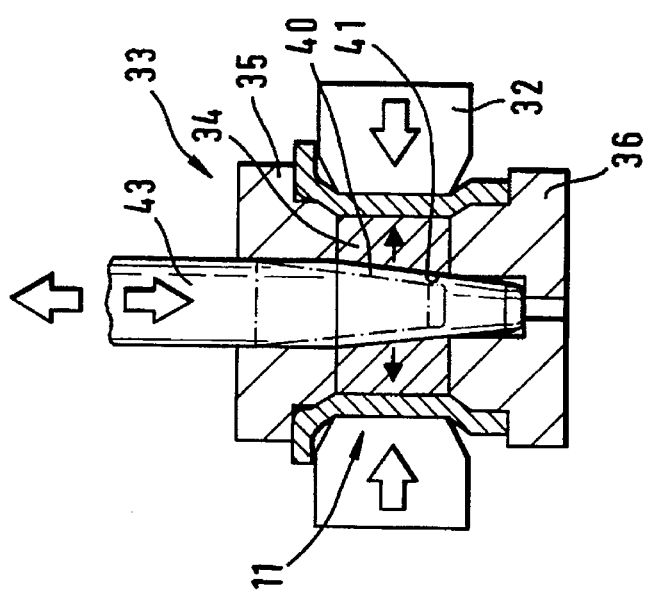

OUTER JOINT PART PRODUCED AS A FORMED PLATE METAL PART

BACKGROUND OF THE INVENTION

The invention relates to an outer joint part for a constant velocity universal ball joint. The joint is produced from a tubular member formed from a plate metal part. The part has substantially longitudinally extending ball tracks intended to receive torque transmitting balls. Constant velocity universal ball joints of this type include the outer joint part described here and have a number of circumferentially distributed longitudinally extending ball tracks; an inner joint part with the same number of associated, circumferentially distributed, longitudinally extending ball tracks; torque transmitting balls received in the ball tracks associated with one another in the outer joint part and inner joint part; and a ball cage provided with circumferentially distributed windows in which the balls are accommodated individually and, in their entirety, held in one plane. The ball cage controls the balls on to the angle bisecting plane between the axes of the outer joint part and the inner joint part.

An outer joint part intended for a constant velocity universal ball joint and produced from a tubular member as a formed plate metal part is known from EP 2673128. The outer joint part, at one end, includes a first end portion which, relative to the central portion, is formed into a cylinder of a larger diameter. At the other end, the outer joint part includes a second end portion reduced to form a cone. The completely axis-parallel ball tracks run into the deformed end portions at the two ends of the outer joint part. After the end regions with the changed cross-sections are formed, the ball tracks are formed radially outwardly by a punch. The purpose of the formations at the two end regions is to avoid any cracks starting from the ends during the deformation process carried out to form the ball tracks.

The above-described outer joint part is limited to constant velocity universal ball joints with completely axis-parallel ball tracks; its design and production method do not allow it to be used for constant velocity universal ball joints whose ball tracks are not completely axis-parallel.

SUMMARY OF THE INVENTION

It is an object of the present invention to propose an outer joint part produced as a formed plate metal part, i.e. from a tubular member, and a method of producing it. The outer joint part is suitable for constant velocity universal ball joints whose ball tracks do not extend in a completely axis-parallel way. The object is also to provide suitable tools for carrying out the method.

The objective is achieved by providing an axial central portion of the tubular member is reduced in cross-section relative to the two axial end regions and provided with ball tracks. Also a substantially radial flange is formed on at least one axial end of the tubular member.

In a particularly advantageous embodiment, the other axial end of the tubular member remains undeformed.

The embodiment in accordance with the invention ensures that, as a result of the cross-section which is reduced relative to the original cross-section, the material in the region of the ball tracks is substantially strengthened, with the tracks running into the deformed and thus also strengthened flange region. The preferred embodiment also ensures that the tracks do not extend as far as the other end of the tubular member so that here, too, there is no risk of any cracks being initiated from the axial end.

Various embodiments of the joint may be designed as follows:
that the center lines of the ball tracks are straight lines and form an angle of distal intersection with the axis of the outer joint part; that the center lines of the ball tracks extend helically and at a constant distance relative to the axis of the outer joint part; that the center lines of the ball tracks form at least two groups with different angles of intersection or inclination relative to the axis of the outer joint part; that the center lines of the ball tracks are curved outwardly relative to the central longitudinal axis of the outer joint part.

Track shapes of the above-mentioned type are of course known from the state of the art. They all have in common and are in accordance with the invention in that, if viewed axially, they are not undercut-free.

A method in accordance with the invention to produce the initially mentioned outer joint part from a tubular member as a formed plate metal part includes, during a first deformation stage, forming a flange by expanding one end of a straight circular-cylindrical tubular portion; during a further deformation stage, preforming the ball tracks by entirely radially reducing an axial central portion above an inner tool; and a final deformation stage, calibrating the ball tracks by entirely radially expanding the axial central portion against an outer tool.

In this way and by forming the flange it is possible, when forming the ball tracks, to prevent the occurrence of cracks starting from the respective end edge of the tubular portion. On the other hand, by applying entirely radial deformation methods, by avoiding drawing operations, the risk of cracks forming as a result of shear stresses in the surfaces is also largely avoided. The desired track shapes which are axially not undercut-free can be achieved by advancing the respective deformation tools in an entirely radial direction.

To facilitate handling and simplify the tools, it is proposed, according to an advantageous embodiment of the invention, to make use of the two wider ends of the tubular member. Different parts of the inner tool, corresponding to the ball tracks, are introduced into the tubular member from opposed axial directions. Following a radial deformation operation, the parts are pulled out of the tubular member from opposed axial directions.

Especially for the purpose of producing ball tracks with different angles of intersection or inclination relative to the axial direction, it is proposed that different parts of the inner tool corresponding to the ball tracks are introduced from opposed axial directions into the tubular member while carrying out opposed helical movements and, following a deformation operation, are pulled out of the tubular member in opposed axial directions while carrying out opposed helical movements.

A suitable device for carrying out the above-mentioned method in accordance with the invention includes radially advancing circumferentially distributed outer tools whose inner surface, in a complementary way, represents the outer contour of the central portion of the outer joint part. Also, inner tools, which include a core part and finger parts and whose outer circumferential face, in a complementary way, represents the inner contour of the central portion of the outer joint part, with the finger parts being positioned in grooves of the core part and representing the track shape, are removed from the core part in the direction of their longitudinal extension.

In accordance to a further embodiment, two groups of finger parts with different angles of intersection or inclination are removable from the core part in opposed axial directions. Also, two groups of finger parts are each radially displaceably held in a finger holding part. Further, a core part is separated between two finger parts along radial planes into circumferential segments. The part includes a central mandrel which has a radial expanding effect on the circumferential segments, or the central mandrel includes a conical face which cooperates with inner conical portions at the circumferential segments.

From the following detailed description, accompanying drawings and subjoined claims, other objects and advantages will become apparent to those skilled in the art.

BRIEF DESCRIPTION OF THE DRAWINGS

Below, the invention will be described with reference to the drawings which illustrate the method of producing a preferred embodiment of an outer joint part in accordance with the invention in different stages by means of the outer and inner tools of the device in accordance with the invention.

FIGS. 1a through 1f are partially in cross-section schematic views of six individual illustrations, which show the operations of forming on a radial flange and of reducing the central portion of an outer joint part in accordance with the invention.

FIGS. 2a through 2c are partially in cross-section schematic views of three individual illustrations, which show the operation of radially calibrating the central portion of an outer joint part in accordance with the invention.

FIG. 2d is an elevation view of FIG. 2c of the joint part in a flattened plane.

DETAILED DESCRIPTION OF THE PREFERRED EMBODIMENT

Figure 3:
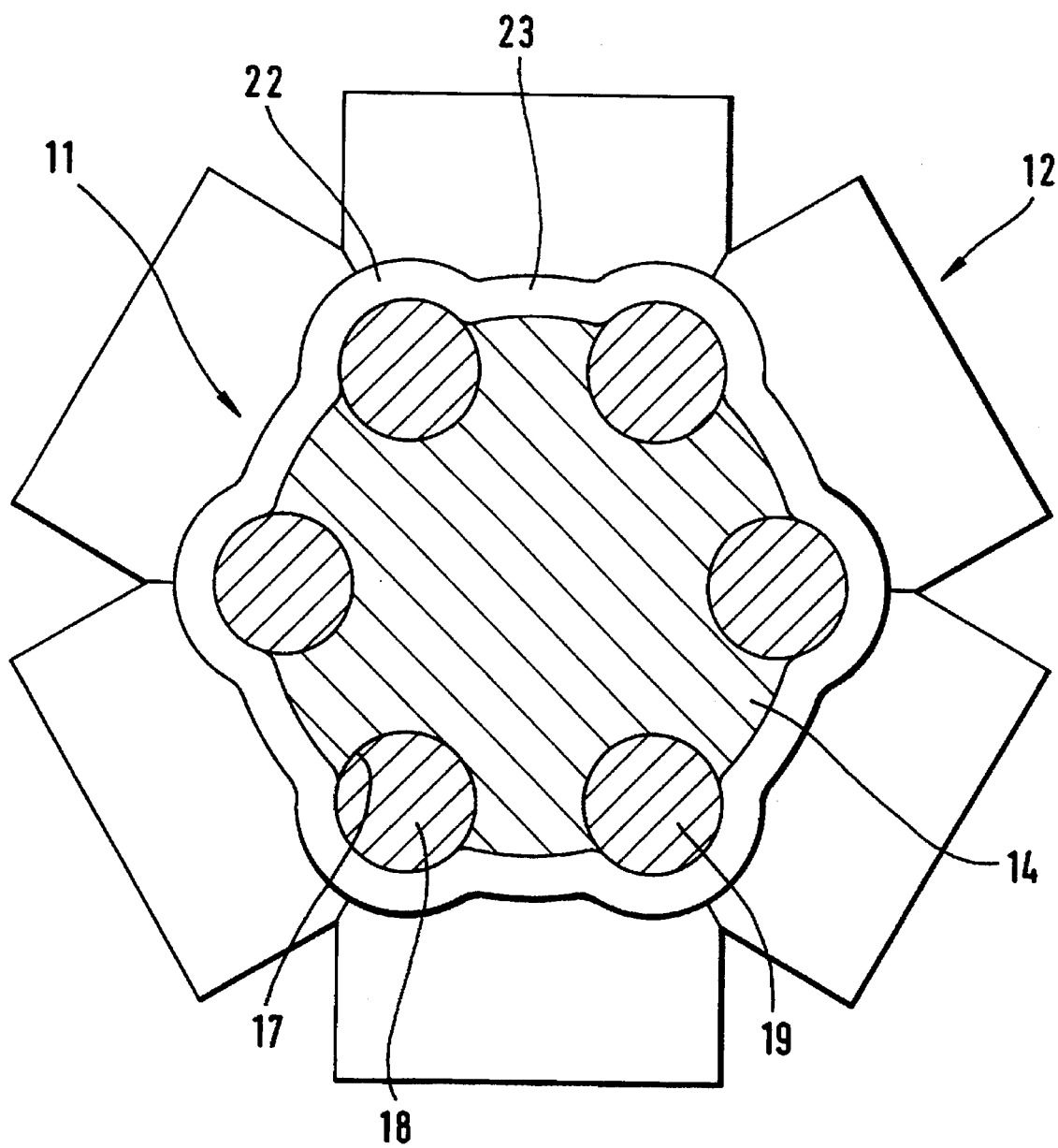
FIG. 3 is a cross-section view of the tool for reducing the central portion in accordance with FIGS. 1c through 1e.

The individual illustrations of FIGS. 1a through 1f and 2a through 2c will be described below, using the same reference numbers.

The individual illustrations of FIGS. 1a through 1f show phases of the first two-stage machining operation and a subsequent second machining operation carried out on the outer joint part.

FIG. 1a shows a straight cylindrical tubular member 1 on which the method in accordance with the invention starts.

FIG. 1b shows the partially deformed tubular member 1' and 1" respectively, with deformation taking place in two phases in an entirely cylindrical die 2 which, on a base plate 3 with an annular projection 4, carries the tubular member. A first punch 5' is used to upset and form a radial flange 6', whereas a second punch 5" is used to complete the radial flange 6" which, hereafter, will only be referred to as flange 6.

FIG. 1c shows the outer joint part 11 which is deformed during a further stage and which includes the above-mentioned flange 6 and a substantially undeformed axial portion 7 at the axially opposed end. Between the two axial end regions, a reduced central portion 8 is identified which includes the ball tracks, as will be shown later. Between the flange 6 and the central portion 8 a conical region of transition 9 is provided and between the undeformed portion 7 and the central portion 8 a portion of transition 10 is provided which is also conical. The operation of radially deforming the central portion 8 takes place in a radially advancing circumferentially divided outer tool 12, while the tubular member 1 is simultaneously supported by a multi-part axially divisible inner tool 13. The inner tool 13 includes a core part 14 for the central portion 8 and parts 15 and 16 for the end portions 6, 9 and 7, 10. Further details of the inner tool 13 whose parts 14, 15, 16 are shown here in section will be identifiable in the following Figures.

FIG. 1d shows the outer joint part 11 after completion of its first deformation stage, with the parts of the outer tools 12 having been removed radially outwardly. Parts 14, 15, 16 are visible in a plan view, with the core part 14 still being in its position inside the outer joint part 11, whereas the parts 15, 16 have been axially removed therefrom while carrying out rotational movements. This figure shows that the core part 14 of the inner tool is provided with grooves 17 which are engaged by, and support, finger parts 18 at the tool part 15 and finger parts 19 at the tool part 16. The finger parts are inclined at different angles relative to the longitudinal axis. In view of the different angles of inclination of each of the three finger parts 18, 19 on each of the tool parts 15, 16, also referred to as finger holding parts relative to one another, there occur, on the outer joint part, alternately differently inclined tracks whose axial run-out portions 20, 21, running into the conical regions of transition 9, 10, are already identifiable. The finger parts 18, 19 are slightly radially displaceable in the finger holding parts 15, 16.

In FIG. 1e, the core part 14 of the inner tool 13 has also been axially removed from the outer joint part 11. The grooves 17 in the core part 14 are again shown with their longitudinal center line. Now the complete tracks 22 are visible in the outer joint part 11 with their run-out portions 20, 21.

FIG. 1f shows the outer joint part 11 on its own after the above-described stages of deformation, including the above-referenced details.

To render the design of the tools more easily understandable, reference is now made to FIG. 3. FIG. 3 shows a cross-section of the central portion 8 of the outer joint part 11 in the configuration according to FIG. 1c. It shows the outer joint part 11 with formed track regions 22 and reduced circumferential regions 23 positioned therebetween. The outer joint part is supported by a circular-cylindrical core 14 of the inner tool which includes grooves 17 into which the finger parts 18, 19 are inserted while carrying out rotating axial movements. The finger parts are circumferentially alternately connected to one of the tool parts 15, 16. FIG. 3 also shows the outer tool 12 which, in a complementary way, corresponds to the joined outer contour of the inner tool 13 and which, in the section shown, is divided in radial planes through the centers of the finger parts 18, 19 and whose individual parts are moved in radially.

The individual FIGS. 2a through 2c show different phases of the final machining operation and are described below one after the other.

FIG. 2a shows the outer joint part 11 which corresponds to FIG. 1f. Reference is therefore made to the numbering of the various details. There is also shown an outer tool 32 which is circumferentially divided and now radially supports the outer joint part from the outside. An inner tool 33 which includes a core part 34 for the central portion 8, two parts 35 and 36 for the axial end portions 6, 9 and 7, 10 and the axially feedable mandrel 43 is inserted into the outer joint part 11. The mandrel 43 includes a conical face 40 which cooperates with an inner cone 41 of the core part 34. The core part 34 is circumferentially divided. By axially moving in the mandrel 43, the individual segments of the core part 34 of the inner tool 33 expand the central portion 8 of the outer joint part 11 against the supporting outer tool 32.

FIG. 2b shows that the circumferential parts of the outer tool 32 which, in this case, have a supporting function have been moved away radially outwardly. Equally, the tool part 35 with the finger parts 38, while carrying out a rotational movement, has been disengaged from the outer joint part 11 and the core part 34 and moved out. The core part 34 has already been axially pulled in the opposite direction, with the inner tool 36 corresponding to the tool part 16 with the finger part 19 no longer shown since it has previously been removed in the direction away from the tool part 35 while carrying out an axial rotational movement. The tool parts 35, 36 are also referred to as finger holding parts. The finger parts 38 and the finger parts (not illustrated) corresponding to the finger parts 16 are radially displaceably held in the tool parts 35, 36. The outer joint part 11 now calibrated against the outer tool 32 is identifiable with all its details as already shown in FIG. 1e.

The details are shown and numbered once again in FIG. 2c on the outer joint part, with the dimensions having changed only in the range of one tenth of a millimeter relative to the embodiment shown in FIG. 1f.

Figure 4:
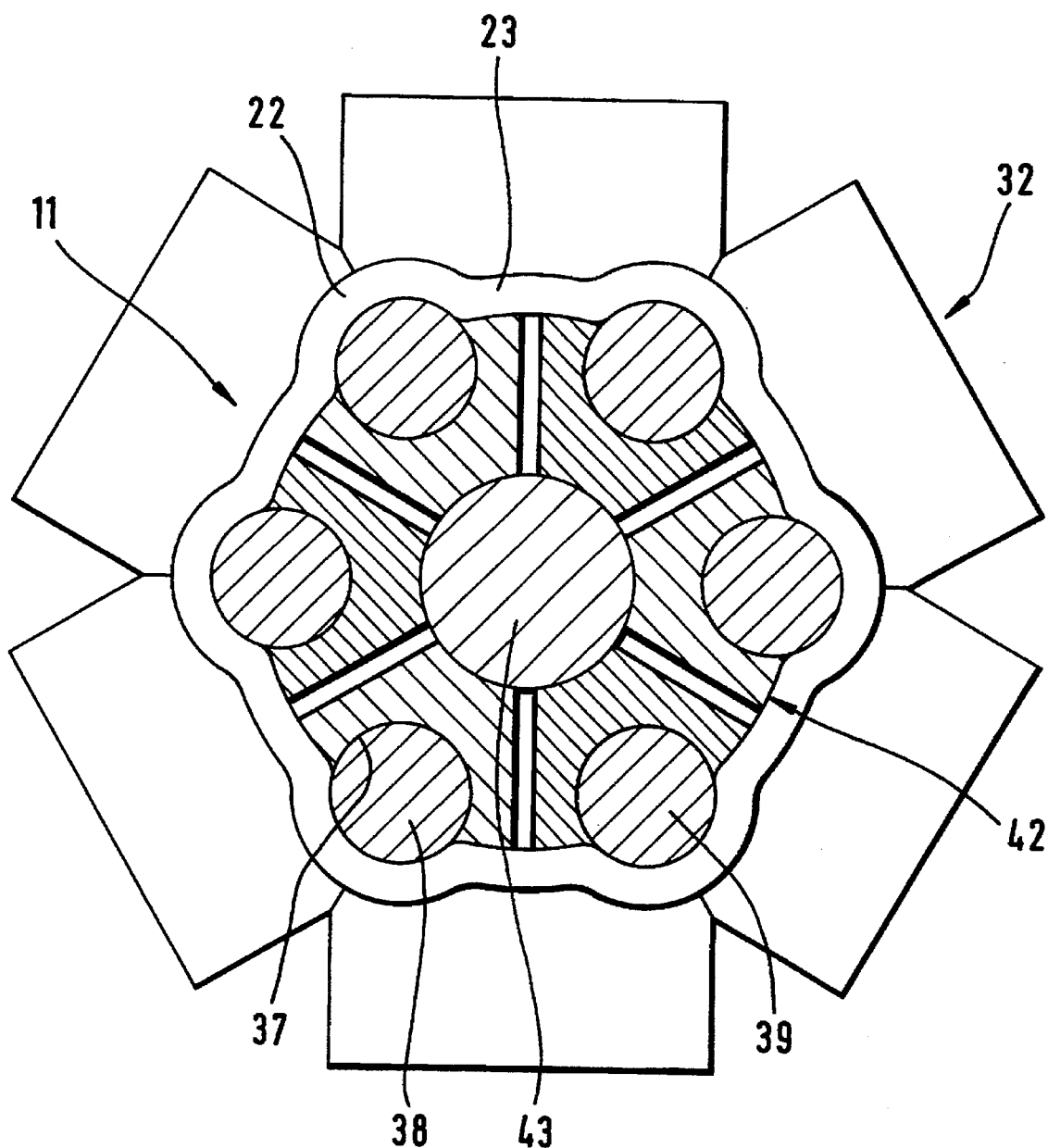
FIG. 4 is a cross-section view of the tool for radially expanding according to FIGS. 2a and 2b.
Figure 5:
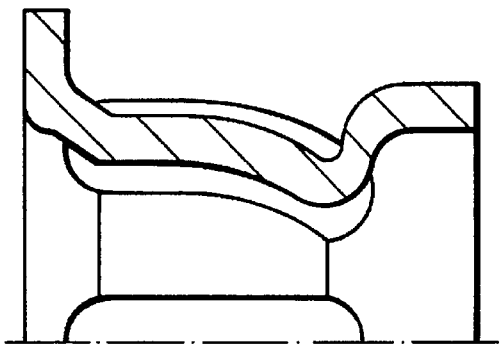
FIG. 5 is a partially in cross-section schematic view of another embodiment of the present invention including ball tracks curved outwardly with reference to the axis.
Figure 6:
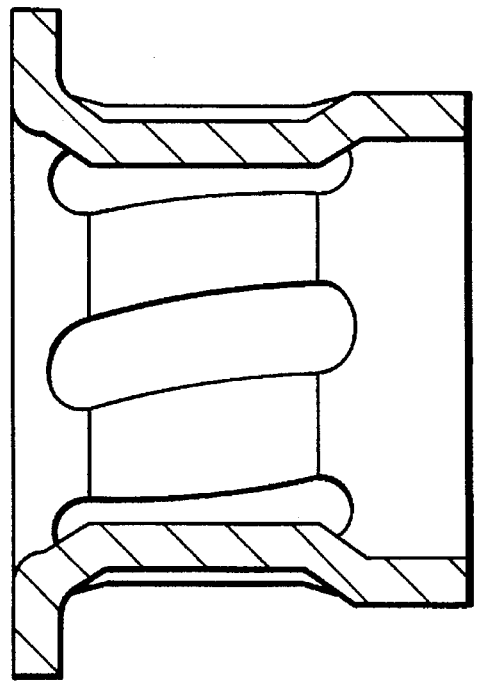
FIG. 6 is a partially in cross-section schematic view of another embodiment of the present invention with the ball tracks extending helically and at a constant distance relative to the axis.

To render the tools used here more easily understandable, reference is now made to FIG. 4 showing a cross-section through the outer joint part 11 with the tools illustrated in FIG. 2a. The elements of the outer joint part 11, the ball track portions 22 and intermediate portions 23, are also identifiable. With the exception of the dimensions, the parts of the outer tool 32 correspond to those of the outer tool 12 according to FIG. 3.

In the section shown here, the core part 34 is formed of circumferential segments 42 which adjoin one another with play in radial dividing planes centrally between two finger parts 38, 39. The finger parts 38, 39 which are each circumferentially alternately connected to one of the finger holding parts 35, 36 engage grooves 37 of the circumferential segments 42. The conical mandrel 43 engages a central recess and when the segments 42 advance axially, it presses radially outwardly for the purpose of calibrating the track regions, with the outer joint part 11 supported on the outer tool 32.

While the above detailed description describes the preferred embodiment of the present invention, the invention is susceptible to modification, variation, and alteration without deviating from the scope and fair meaning of the subjoined claims.

We claim:

1. An outer joint part for a constant velocity universal ball joint, produced from a tubular member as a formed plate metal part and having substantially longitudinally extending ball tracks for receiving torque transmitting balls, comprising:

an axial central portion of the tubular member is reduced in cross-section relative to two axial end regions and provided with said ball tracks;

a substantially radial flange is formed on at one axial end of the tubular member; and center lines of the ball tracks extend in a non-parallel way relative to a central longitudinal axis of the outer joint part, the ball tracks being symmetrical each in cross section with respect to the central longitudinal axis and the axial central portion being circular between the ball tracks with respect to the central longitudinal axis.

2. A joint according to claim 1, wherein the other axial end of the tubular member positioned opposite the flange is formed by an undeformed portion of the tubular member.

3. A joint according to claim 1, wherein the center lines of the ball tracks are straight lines and form an angle of distal intersection with the axis of the outer joint part.

4. A joint according to claim 3, wherein the center lines of the ball tracks form at least two groups with different angles of distal intersection to the axis of the outer joint part.

5. A joint according to claim 1, wherein the center lines of the ball tracks extend helically and at a constant distance relative to the axis of the outer joint part.

6. A joint according to claim 5, wherein the center lines of the ball tracks form at least two groups with different angles of inclination relative to the axis of the outer joint part.

7. A joint according to claim 1, wherein the center lines of the ball tracks are curved outwardly with reference to the axis of the outer joint part.

\* \* \* \* \*